(12) United States Patent
Mohr et al.

(10) Patent No.: US 8,066,456 B2
(45) Date of Patent: Nov. 29, 2011

(54) CLAMPING DEVICE

(75) Inventors: Peter Mohr, Wiggensbach (DE); Josef Greif, Friesenried (DE)

(73) Assignee: Ott-Jakob GmbH & Co. Spanntechnik KG, Lengenwang (DE)

( * ) Notice: Subject to any disclaimer, the term of this patent is extended or adjusted under 35 U.S.C. 154(b) by 1056 days.

(21) Appl. No.: 11/816,991

(22) PCT Filed: Jan. 21, 2006

(86) PCT No.: PCT/EP2006/000536
§ 371 (c)(1), (2), (4) Date: Nov. 5, 2007

(87) PCT Pub. No.: WO2006/089608
PCT Pub. Date: Aug. 31, 2006

(65) Prior Publication Data
US 2008/0315535 A1  Dec. 25, 2008

(30) Foreign Application Priority Data
Feb. 26, 2005  (DE) .......................... 10 2005 008 892

(51) Int. Cl.
*B23B 31/103* (2006.01)
(52) U.S. Cl. ............ 409/234; 409/230; 409/233; 279/55
(58) Field of Classification Search .......... 409/231–234, 409/230; 279/46.1, 50, 55, 57, 74
See application file for complete search history.

(56) References Cited

U.S. PATENT DOCUMENTS

| 3,474,705 | A |   | 10/1969 | Jacob, Jr |
| 3,762,271 | A | * | 10/1973 | Poincenot ..................... 409/233 |
| 4,303,360 | A | * | 12/1981 | Cayen et al. .................. 409/233 |
| 4,335,498 | A |   | 6/1982  | Hague et al. |

(Continued)

FOREIGN PATENT DOCUMENTS
DE  33 12 571 A1  10/1983
(Continued)

OTHER PUBLICATIONS
International Search Report PCT/EP2006/000536, Aug. 2, 2006.
(Continued)

*Primary Examiner* — Daniel Howell
(74) *Attorney, Agent, or Firm* — Martin Fleit; Paul D. Bianco; Fleit Gibbons Gutman Bongini & Bianco, PL

(57) ABSTRACT

The invention relates to a clamping device for removably mounting a tool (3) or a tool fixture in a receiving part (1). Said clamping device comprises several pincers elements (33) which are concentrically arranged around a central axis (32) within the receiving part (1) and are impinged upon by a tension spring (39) so as to be moved into a clamping position in order to brace the tool (3) or the tool fixture. In order to be able to automatically replace a tool without using much force and energy, an axially movable closing element (17) is assigned to the pincers elements (33). Said closing element (17) impinges the pincers elements (33) in a forward position that is advanced in the direction of the pincers elements (33) for mounting purposes in the clamping position thereof, which is swiveled inward by means of the tension spring (39), while being movable into a retracted position with the aid of a detaching device (12, 16, 45, 46, 47) in order to release the pincers elements (3).

20 Claims, 7 Drawing Sheets

U.S. PATENT DOCUMENTS

| | | | | |
|---|---|---|---|---|
| 4,548,532 A | * | 10/1985 | Watanabe et al. | 409/233 |
| 4,560,310 A | * | 12/1985 | Eckstein et al. | 409/233 |
| 4,620,824 A | * | 11/1986 | Eckstein et al. | 409/233 |
| 5,730,562 A | * | 3/1998 | Matsumoto et al. | 409/233 |
| 5,735,651 A | * | 4/1998 | Harroun | 409/233 |

FOREIGN PATENT DOCUMENTS

| | | | |
|---|---|---|---|
| DE | 84 02 787 U1 | | 5/1985 |
| DE | 3405368 A | * | 8/1985 |
| DE | 3524739 A1 | | 2/1986 |
| DE | 3512890 A | * | 10/1986 |
| DE | 697 11 737 T2 | | 1/1997 |
| DE | 197 03 354 C1 | | 3/1998 |
| DE | 200 03 763 U1 | | 8/2000 |
| DE | 102 59 989 A1 | | 7/2004 |
| EP | 0909 601 A | | 4/1999 |
| FR | 2577830 A1 | * | 8/1986 |
| JP | 06335835 A | * | 12/1994 |
| JP | 09141505 A | * | 6/1997 |

OTHER PUBLICATIONS

International Preliminary Report on Patentability PCT/EP2006/000536, Sep. 11, 2007.

* cited by examiner

CLAMPING DEVICE

FIELD OF THE INVENTION

The invention concerns a clamping device and a clamping system.

BACKGROUND OF THE INVENTION

Clamping devices for removable mounting of tools or tool fixtures in a receiving part generally have a collet chuck arranged in the receiving part, or a clamping set with several pincer elements distributed around the periphery to engage with the tool or tool fixture. In conventional clamping devices, the pincer elements are generally arranged on an axially movable mount or they are activated by an axially displaced clamping cone. In both designs, however, relatively large axial displacements or travel movements of the pincer mount or the clamping cone are required to move the pincer elements between a clamping and a releasing position. Since these travel movements usually occur against the force of a clamping spring when loosening the collet chuck, a relatively high expenditure of force and energy is thereby required. Furthermore, an appropriately large design space must be provided for the necessary travel movements.

SUMMARY OF THE INVENTION

The problem of the invention is to create a clamping device and a clamping system of compact construction to enable an automatic tool changing process even without major expenditure of force and energy, while still safely and reliably mounting the tools.

This problem is solved by a clamping device and by a clamping system as set forth in the claims. Expedient embodiments and advantageous modifications of the invention are the subject of the dependent claims.

In the clamping device of the invention, no major axial displacements or travel movements of an activating element are needed to activate the collet chuck. The pincer elements of the collet chuck are axially fixed inside the receiving part and are constantly forced by a clamping spring into a locking position. Moreover, the pincer elements are coordinated with a closing element, which further clamps the pincer elements and holds them in the locking position. Thanks to a loosening mechanism, the closing element can be pushed into a retracted position and thus releases the pincer elements to swivel into their open position. No major shifting of the closing element is needed for this, nor any major expenditure of force or energy. Thus, instead of a hydraulic activation, there can also be a pneumatic or electrical activation of the clamping device. Even when the closing element is moved into the retracted release position, at first the collet chuck remains closed due to the clamping spring and continues to hold the tool fast. Only when the tool is pushed out from the receiving part, e.g., by the front end of a forcing lever, or pulled out from the receiving part with a corresponding pulling force by an automatic tool changer or by hand, do the pincer elements swivel against the force of the clamping spring into an open position and release the tool. In this way, an unintentional dropping out of the tool is prevented.

Due to its compact construction, the clamping device of the invention is especially well-suited for installation in a tool fixture or tool-changing head. Such tool-changing heads, thanks to their low weight and small size, enable fast and easy handling. Different tools, even tools for different technologies, can be easily inserted in the tool-changing heads and be changed automatically as needed. In this way, it is also possible to reduce the size of the tool magazines of machine tools, since instead of complete tools one need only provide tool-changing heads. However, the clamping device is not confined to installation in a tool fixture or tool-changing head, but rather it can also be integrated appropriately in a working spindle for the automatic clamping of tool fixtures or tools.

The loosening mechanism in one expedient embodiment contains a pull rod, which is activated by means of a push rod via a loosening gear and which is connected to the closing element. The loosening gear transforms a forward movement of the push rod into a backward movement of the pull rod and vice versa. The forward movement of the pull rod can thus be used to push out the tools, while the simultaneous backward movement of the pull rod retracts the closing element and thus allows for the opening of the collet chuck. The displacement of the push rod can be achieved, e.g., by a hydraulically operated loosening unit. But the closing element can also be displaced directly by an electrical, pneumatic or other suitable drive system.

In one expedient embodiment, the closing element is configured in the manner of a bushing with clamping claws projecting in the direction of the pincer elements. The clamping claws have slanted clamping surfaces to bear against the corresponding slanted bearing surfaces of the pincer elements. In this way, the pincer elements can be firmly pushed into the locking position and yet be released for opening with only a slight displacement of the closing element.

The clamping system of the invention has a first clamping device integrated in a working spindle of a machine toot and a tool-clanging head, removably arranged in the working spindle and removably secured by the first clamping device, with a second clamping device integrated inside it. Both clamping devices can preferably be activated by an activation unit coordinated with the working spindle, so that both an automatic tool change and an automatic changing of tool-changing heads is made possible.

BRIEF DESCRIPTION OF THE DRAWINGS

Further details and benefits of the invention will become clear from the following description of a preferred embodiment example by means of the drawing. It shows.

DETAILED DESCRIPTION OF THE INVENTION

Figure 1:
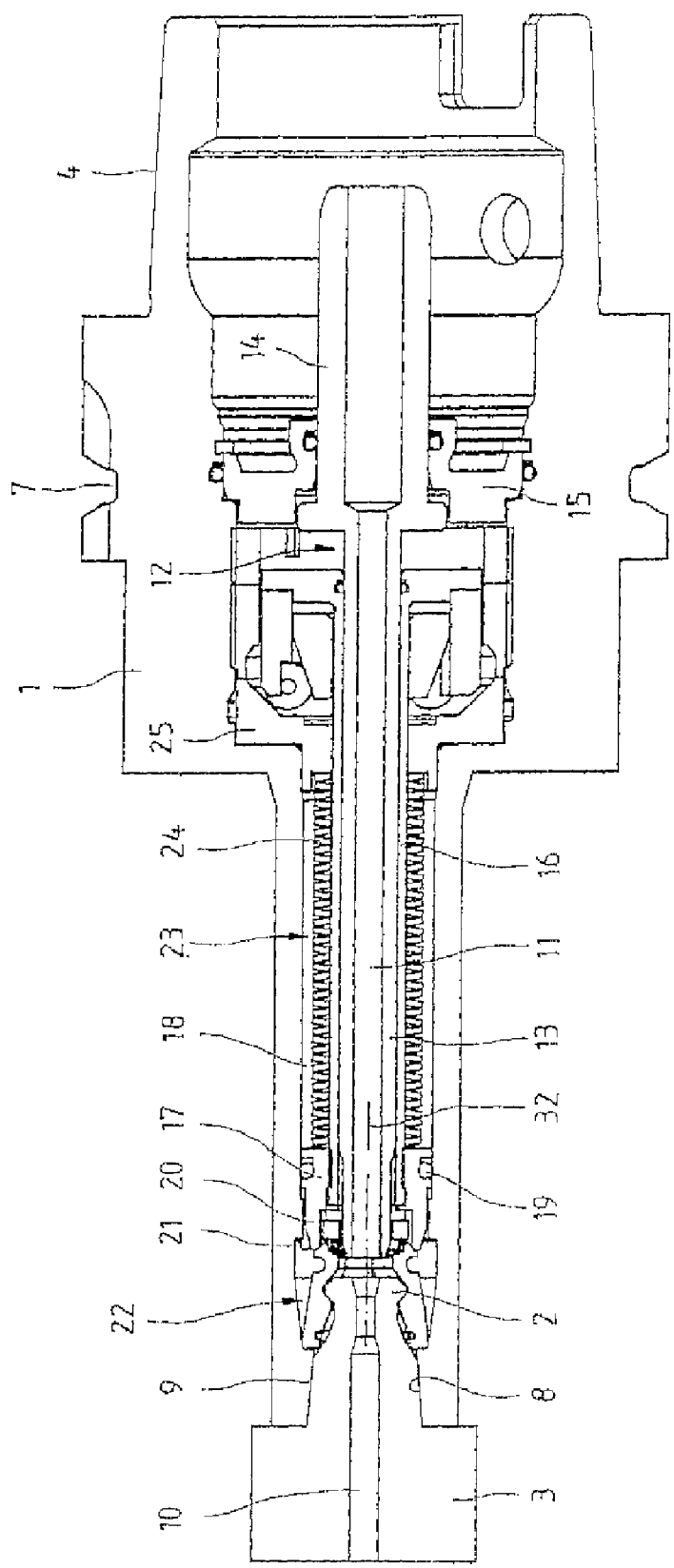
FIG. 1: a tool holder with an integrated clamping device in longitudinal cross section.

FIG. 1 shows an essentially hollow cylindrical receiving part 1, in which is integrated a clamping device for the automatic clamping of a tool 3 provided with a tightening bolt 2. In the embodiment shown here, the hollow cylindrical receiving part 1 is designed as a tool fixture, which can be inserted in a known work spindle of a machine tool, e.g., by an automatic tool changer, and clamped there by a likewise known clamping mechanism. For this purpose, the hollow cylindrical receiving part 1 has, at its right rear end in FIG. 1, an outer cone 4 for insertion into a corresponding inner cone 5 at the front end of a work spindle 6, shown in FIG. 7. Moreover, on the outside of the receiving part 1 there is a circumferential groove 7 for a tool gripper of the automatic tool changer or the like.

At the left front end in FIG. 1, the hollow receiving part 1 contains an inner cone 8 to receive a corresponding outer cone 9 of the tool 3. The tool 3 has a continuous central channel 10 for supplying a cooling agent or the like. Inside the hollow receiving part 1, a movable push rod 12 provided with a continuous borehole 11 is situated. The push rod 12 contains a thin front part 13 and a thick rear part 14, which is arranged to be axially movable in the receiving part 1, sealed off by a guide bushing 15 provided with packings. At the thin front part 14 of the push rod 12 is arranged a movable hollow pull rod 16, coaxial with it. At the front end of the pull rod 16 is fastened a closing element 17, shown enlarged in the figure. The closing element 17, designed as a kind of bushing, can move inside a borehole 18 of the receiving part 1 and is sealed radially with an O-ring 19. The closing element 17 contains forward-projecting clamping claws 20, which grab a holding element 21 shown enlarged in FIG. 5 and engaging with a collet chuck 22 shown enlarged in the figure. The pull rod 16 with the closing element 17 attached to it is pressed forward in the direction of the collet chuck 22 by a spring arrangement 23. In the embodiment shown, the spring arrangement 23 consists of a disk spring pack, in which several disk springs 24 are arranged about the pull rod 16 and clamped between the rear end of the closing element 17 and the front end of a bearing bush 25, firmly arranged in the receiving part 1.

Figure 4:
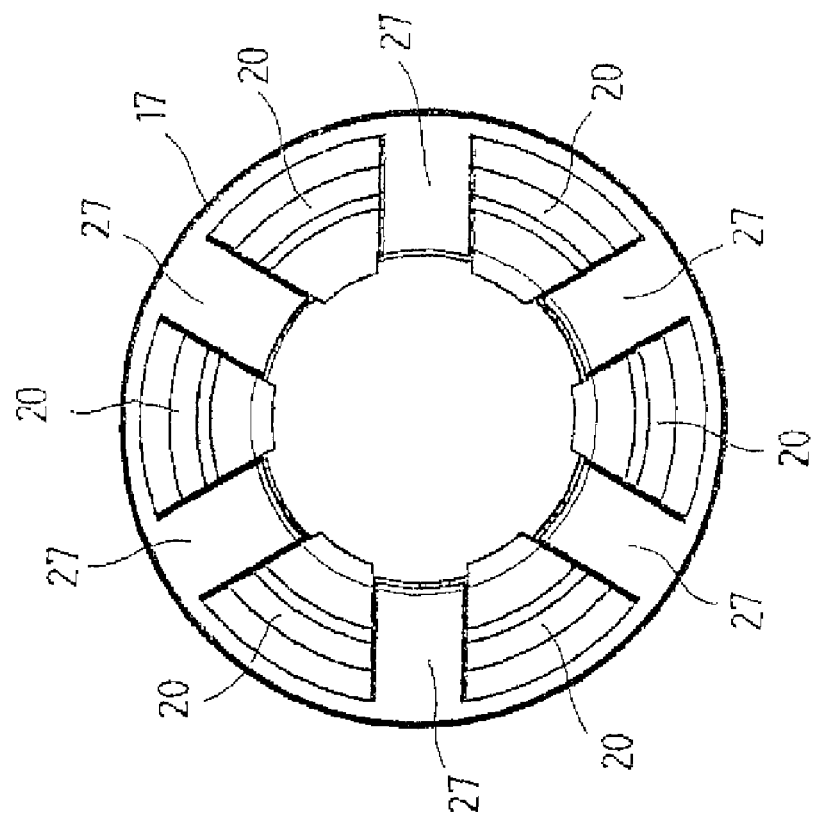
FIG. 4: a closing element of the clamping device shown in FIG. 1, in a front view and a cross-sectional side view.
Figure 4:
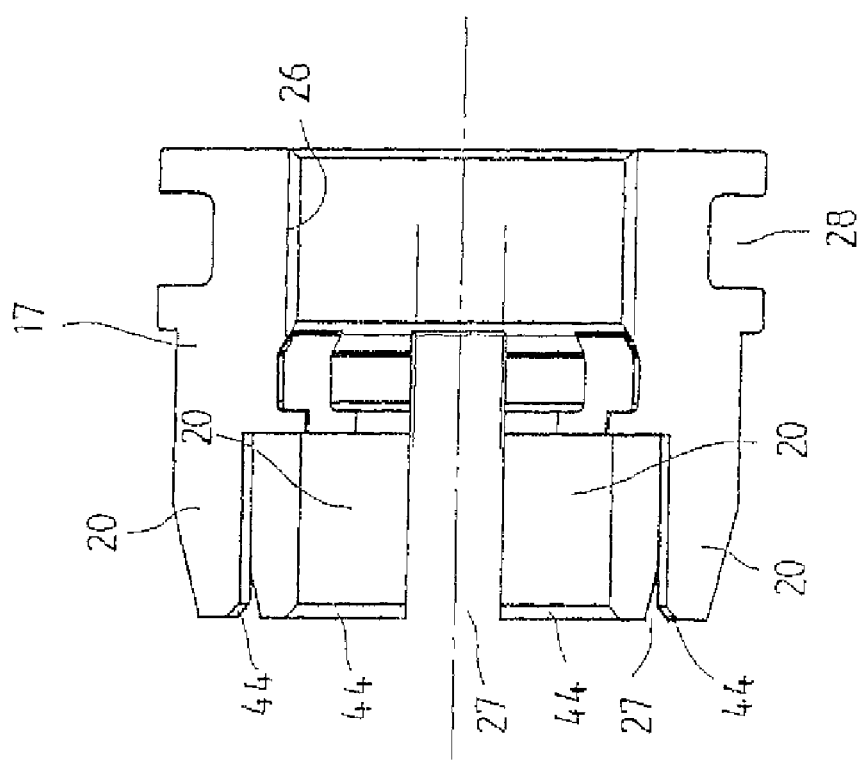

As follows from FIG. 4, the closing element 17 which is fastened with interior threads 26 on the front end of the pull rod 16 contains six clamping claws 20 projecting forward in the direction of the collet chuck 22, having a cross section in the form of a ring segment. Between the forward-beveled clamping claws 20 are provided rectangular slots 27. On the outside, furthermore, the closing element 17 has an annular groove 28 for the O-ring 19 shown in FIG. 1.

Figure 5:
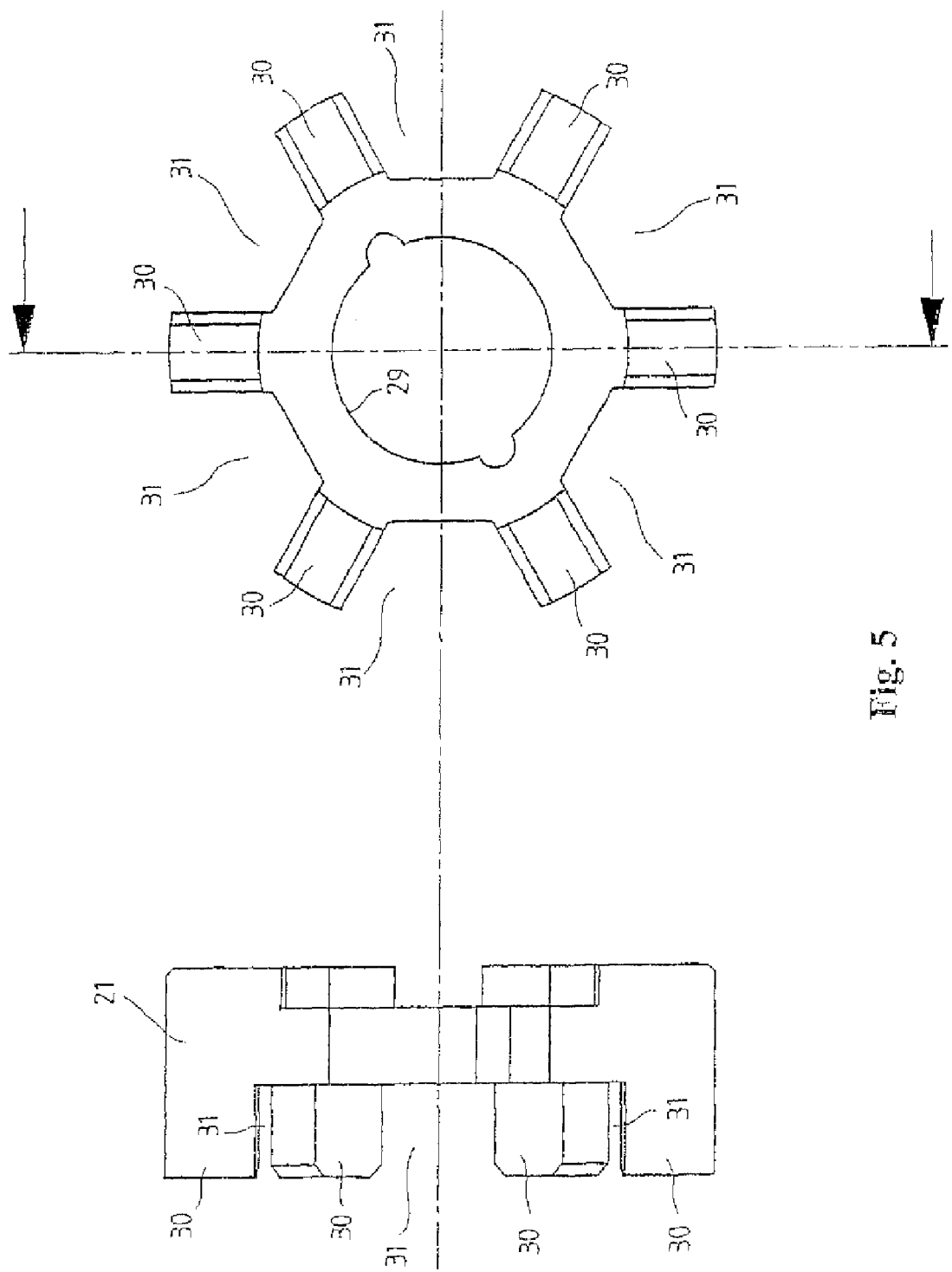
FIG. 5: a holding element of the clamping device shown in FIG. 1 in a front view and a cross-sectional side view.

FIG. 5 shows an enlarged view of the holding element 21 which interacts with the closing element 17. It has a continuous opening 29 and six studs 30 projecting outwardly in a star pattern, between which intermediate spaces 31 are provided for the engagement of the clamping claws 20. The starlike holding element 21 is fixed inside the receiving part 1 and forms a firm bearing point for the closing element 17, which is forced forward by the spring arrangement 23.

Figure 6:
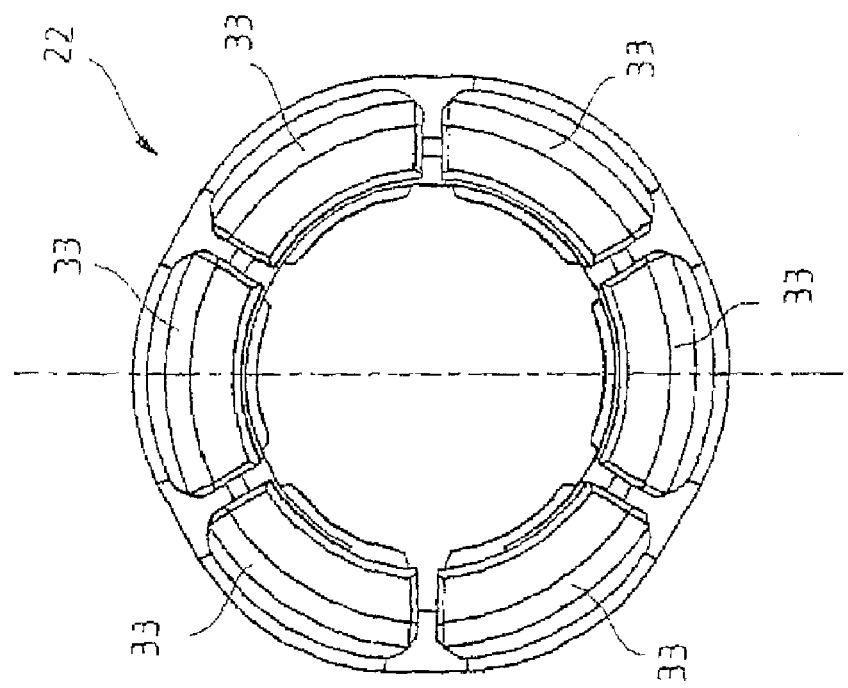
FIG. 6: a collet chuck of the clamping device shown in FIG. 1 in a front view and a cross-sectional side view.
Figure 6:
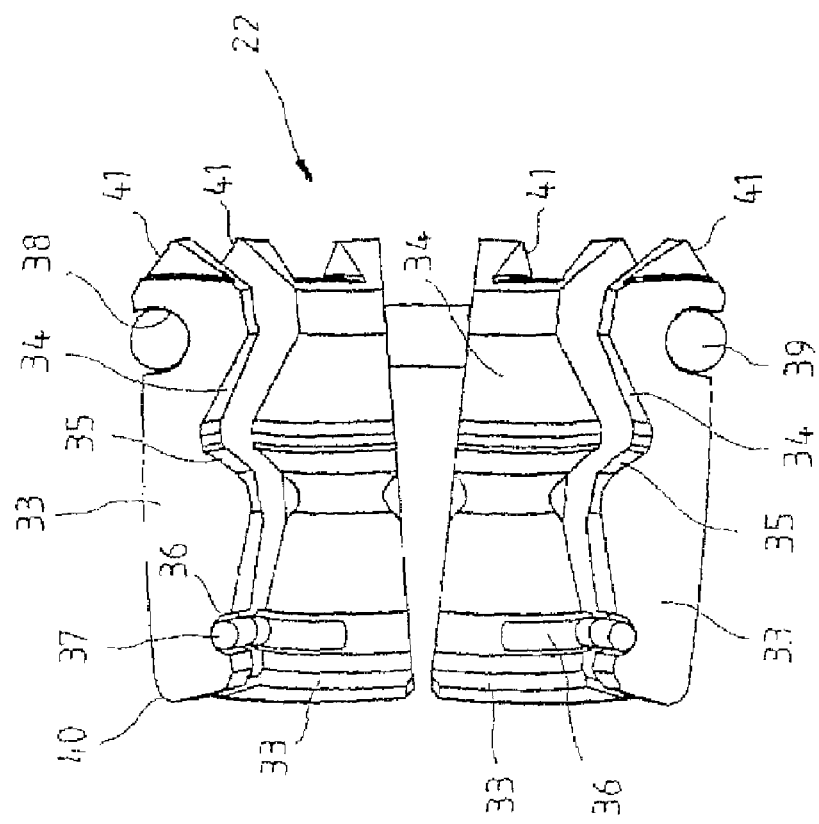

FIG. 6 shows the collet chuck 22 in a cross-sectional view and a front view. In the embodiment shown, it consists of six pincer elements 33 arranged concentrically about a central axis 32 of the receiving part 1, having a wedge-shaped recess 34 at their inner side, with a forward sloping draw-in surface 35. At the inner side of the pincer elements 33 an inner annular groove 36 is provided for a lock washer 37. The pincer elements 33, furthermore, have an outer annular groove 38 on their outer side for a tension spring 39, designed here as an annular spring. At the left front end in the cross-sectional view of FIG. 6, the pincer elements 33 have a rounded bearing edge 40, while at the right rear end of the pincer elements 33 a slanted working surface 41 is provided.

Figure 2:
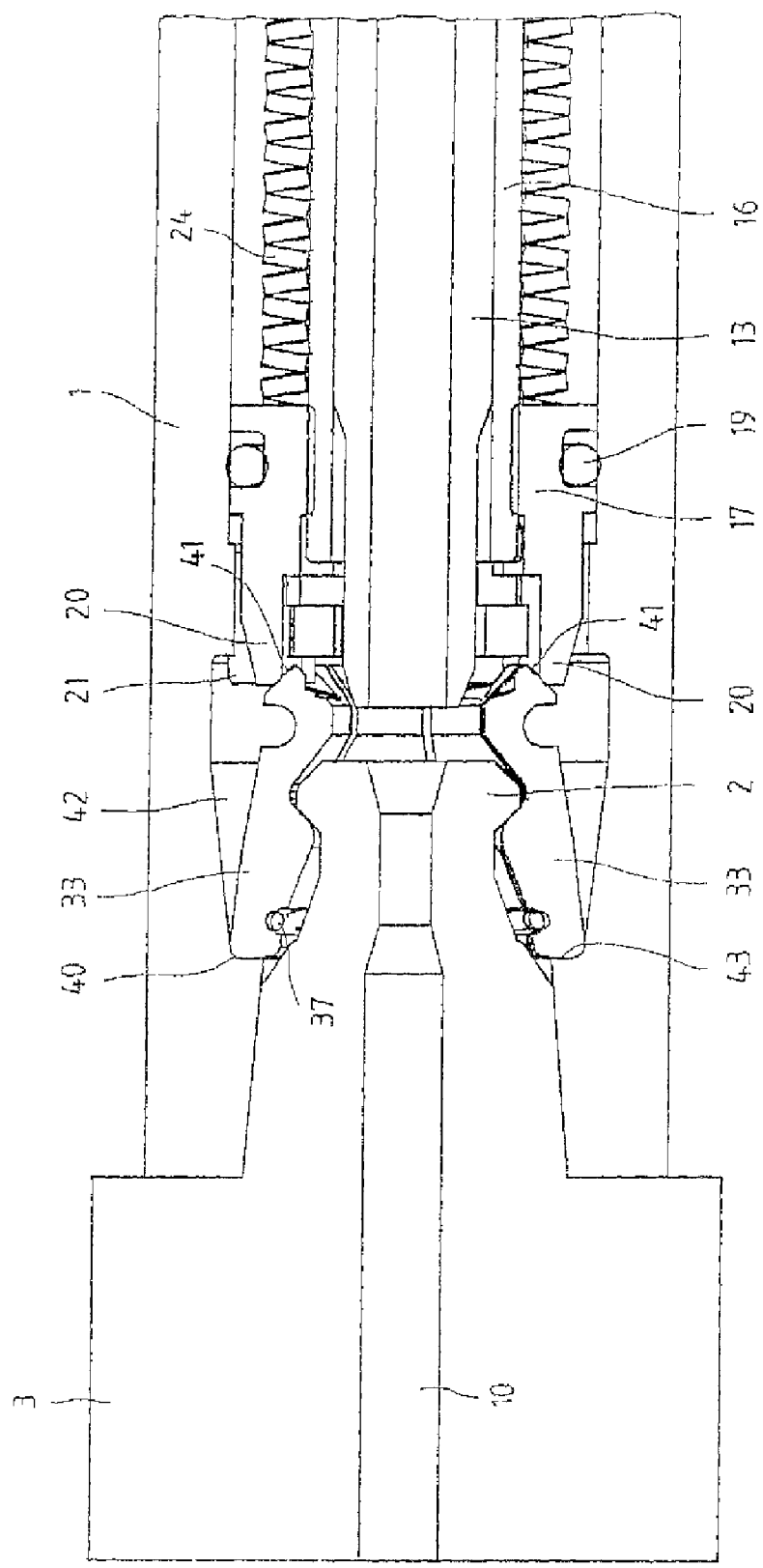
FIG. 2: the front part of the tool holder shown in FIG. 1, in an enlarged cross-sectional view.

As is especially evident in FIG. 2, the pincer elements 33 are arranged in a corresponding recess 42 of the receiving part 1. The front ends of the pincer elements 33 lie with their rounded front edges 40 against an annular shoulder 43 inside the receiving part 1 and are forced radially outward by the split washer 37. At their rear ends, the pincer elements 33 are instead forced radially inward by the tension spring 39, not shown here. The tightening bolt 2 of the tool 3 is thereby enclosed by the wedgelike recesses 34 of the pincer elements 33 and pulled into the receiving part 1 by the slanted draw-in surface 35. In the clamping position shown in FIG. 2, the rear ends of the pincer elements 33 are moreover pushed inwardly by the forward projecting clamping claws 20 of the closing element 17, which is forced forward by the spring arrangement 23. For this purpose, the clamping claws 20 have slanted clamping surfaces 44, identifiable at their front ends in FIG. 4, to bear against the slanted working surfaces 41 of the pincer elements 33.

Figure 3:
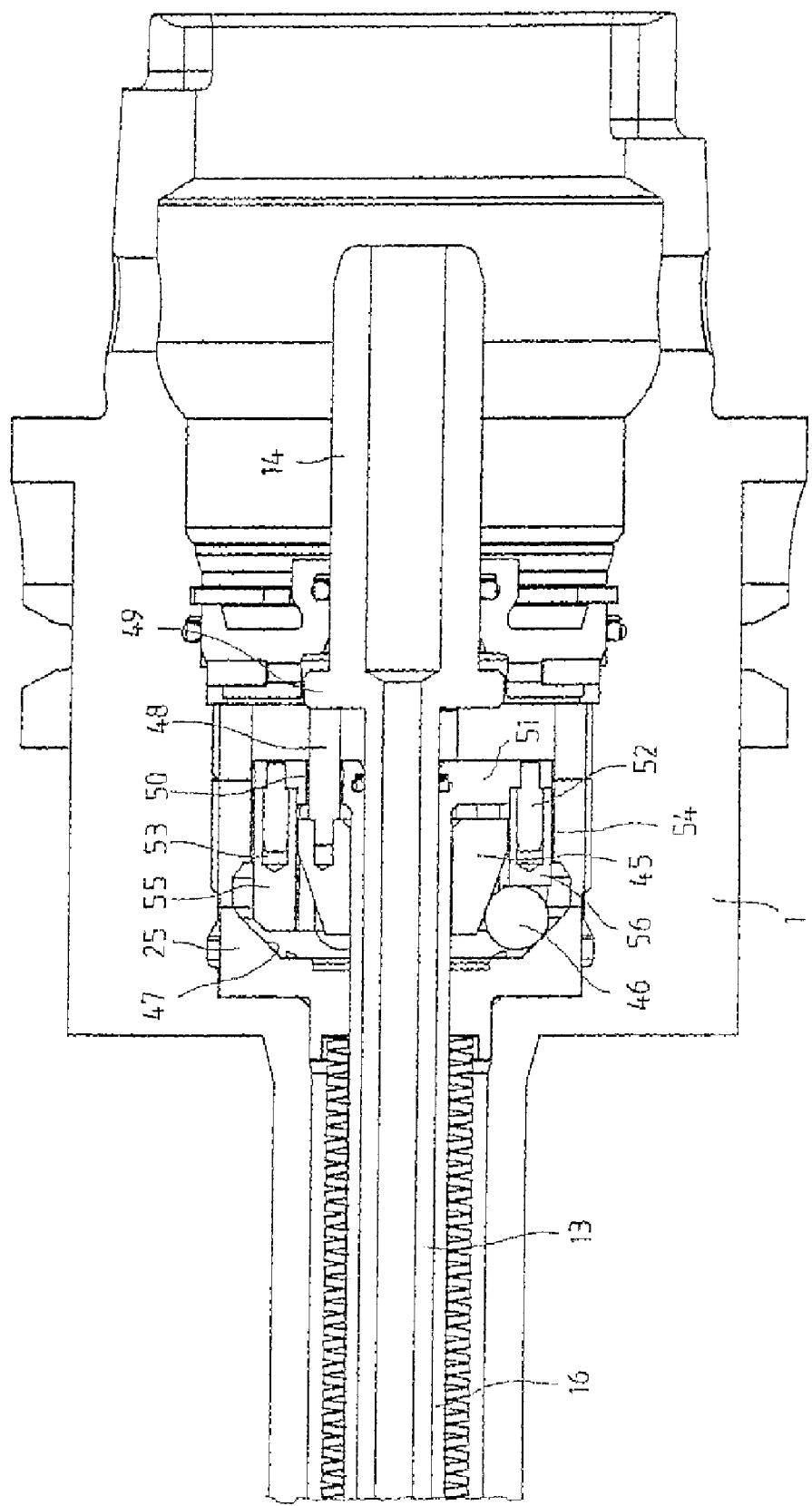
FIG. 3: the rear part of the tool holder shown in FIG. 1, in an enlarged cross-sectional view.

FIG. 3 shows a loosening gear for loosening the collet chuck 22. Thanks to this loosening gear, a forward movement of the push rod 12 is converted into a backward movement of the pull rod 16 and vice versa. The loosening gear contains a clamping cone 45, which is braced at its front cone surface via balls 46 against a conical bearing surface 47 on the inside of the bearing bush 25 arranged firmly in the receiving part 1. The clamping cone 45 is braced at the back side by several pressing pins 48 distributed about the circumference against an annular shoulder 49 of the push rod 12. The pressing pins 48 are screwed in at the rear side of the clamping cone 45 and protrude through continuous holes 50 in an annular flange 51 at the rear end of the pull rod 16. The rear free ends of the pressing pins 48 lie against the front side of the annular shoulder 49 of the push rod 12. On the outside of the annular flange 51 are secured forward-projecting pins 52, which engage with corresponding blind holes 53 at the rear side of a pressing ring 54. The pressing ring 54 contains alternately forward-projecting and retracted studs 55 and 56, respectively, while the projecting studs 55 serve as spacers for the balls 46 and the retracted studs 56 lie with their front ends against the balls 46.

The mode of operation of the above-described clamping device will now be explained by means of FIGS. 1 to 3. In these figures, the clamping device is shown in a clamping position. In the clamping position shown, the pincer elements 33 of the collet chuck 22 are pressed inwardly at their rear ends by the annular spring 29 and by the clamping claws 20 of the closing bush 17, which is pushed forward via the spring arrangement 23. In this way, the tightening bolt 2 of the tool 2 [sic; 3] is clamped and drawn into the receiving part 1. The pincer elements 33 are held in the clamping position by the clamping claws 20 of the closing bush 17, thereby assuring a secure bracing of the tool 3 in the receiving part 1, which is configured here as a tool fixture.

To loosen and release the tool 3, the push rod 12 is pressed forward in the direction of the tool 3 by an activating mechanism, not shown here. In this process, the clamping cone 48 is likewise pushed forward via the pressing pins 48. In this way, the balls 46 bearing against the conical bearing surface 47 wander radially outward and shove back the pressing ring 54 and the pull rod 16 connected to the latter via the pins 52. The closing bush 17 secured to the front end of the pull rod 16 is also shoved backward against the force of the spring arrangement 23, so that the clamping claws 20 of the closing bush 17 are disengaged from the pincer elements 33. Even when the clamping claws 20 are disengaged from the pincer elements 33, the rear ends of the pincer elements 33 are still pressed radially inward by the annular spring 39. Thus, the tool 3 is still held in the receiving part 1, but it can be removed from the receiving part 1 by an appropriate pulling force. The length of the push rod 12 can be chosen such that the tool 3 is pushed out by its front end.

The above-described clamping device is not limited to use in an interchangeable too, holder. The clamping device can also be installed accordingly, for example, in a driven rotary spindle of a machine tool for the automatic clamping of tools or tool fixtures.

Figure 7:
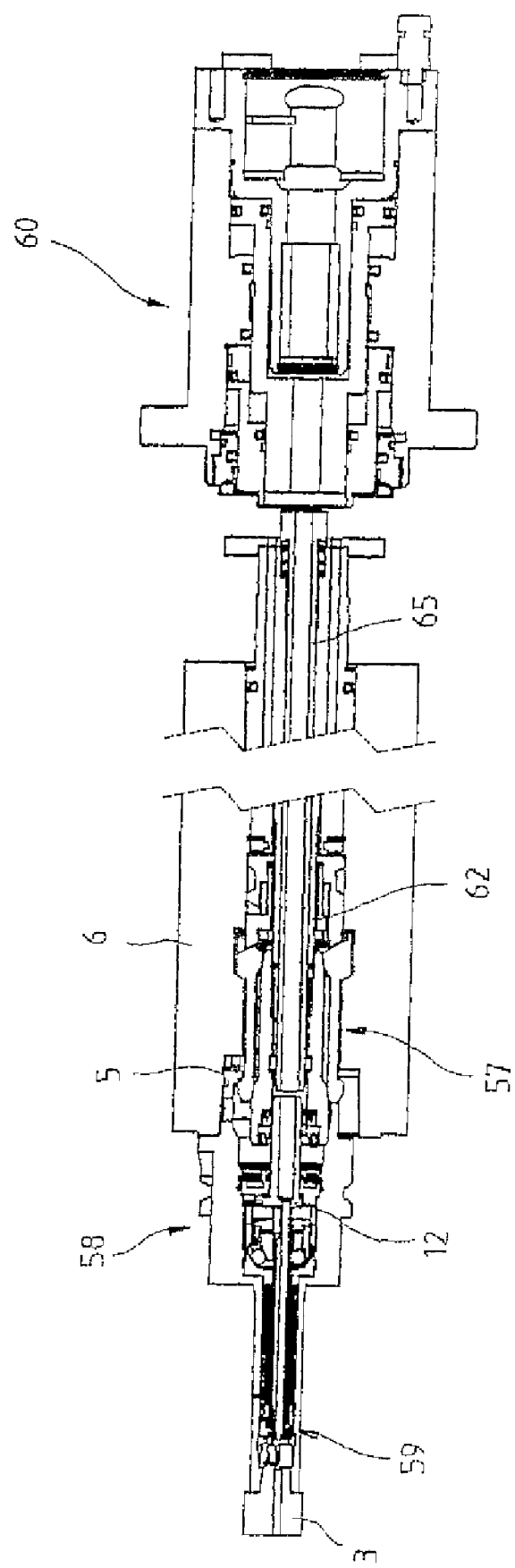
FIG. 7: a clamping system with a work spindle and a tool-changing head.

FIG. 7 shows a clamping system with a driven rotary work spindle 6 of a machine tool, a first clamping device 57 integrated in the work spindle 6, a tool-changing head 58 interchangeably arranged in the work spindle 6 and removably secured by the first clamping device 57, with an integrated second clamping device 59 and a loosening unit 60 for loosening the first and second clamping devices 57 and 59. The construction and mode of operation of the tool-changing head 58 with the integrated clamping device 59 has been explained above at length. The first clamping device 57 integrated in the work spindle 6 contains a clamping sleeve 61, which is arranged at the front end of a hollow clamping rod 62, arranged inside the work spindle 6 and able to move coaxially to its central axis. The clamping sleeve 61 is surrounded by several clamping claws 63, able to move radially by the axial movement of the clamping sleeve 61. The clamping claws 63 are guided by a spacer 64 and kept at a distance from each other in the circumferential direction. The clamping sleeve 61 is pulled back by a spring arrangement, not shown here, so that the clamping claws 63 are forced radially outward for the clamping of the tool-changing head 58. To loosen the tool-changing head 58, the clamping rod 62 with the clamping sleeve 61 attached to it has to be pushed forward against the force of the spring arrangement, whereby the clamping claws are shoved radially inward and release the tool fixture 58. The construction and mode of operation of such a clamping device is explained at length in DE 101 59 611 C1. Therefore, the content disclosed in said publication is expressly made to be the subject of the present application.

In the clamping system shown in FIG. 7, a hollow activating rod 65 is led movably inside the clamping rod 62 for moving the push rod 12 inside the tool fixture 58. The loosening unit 60 is designed so that the clamping rod 62 and/or the activating rod 65 can be pushed forward and thereby loosen the clamping of the tool 3 inside the tool-changing head 58 and/or the clamping of the tool-changing head 58 in the work spindle 6. For this purpose, the loosening unit 60 can have two separate pushing pistons, which can be deployed separately from each other or jointly.

The invention claimed is:

1. A clamping device for removably mounting a tool (3) or a tool fixture in a receiving part (1), the device containing several pincer elements (33) which are concentrically arranged around a central axis (32) within the receiving part (1) and are impinged upon by a tension spring (39) so as to be moved into a clamping position in order to brace the tool (3) or the tool fixture, wherein the pincer elements (33) are coordinated with an axially movable closing element (17), which, in a forward position that is advanced in a direction of the pincer elements (33), pushes the pincer elements (33) for mounting purposes in their clamping position, which is swiveled inwardly by the tension spring (39), and which can move into a retracted position by a loosening mechanism (12, 16, 45, 46, 47) in order to release the pincer elements (33).

2. The clamping device according to claim 1, wherein the loosening mechanism (12, 16, 45, 46, 47) contains a pull rod (16), the pull rod (16) connected to the closing element (17) and activated by means of a push rod (12) via a loosening gear (45, 46, 47).

3. The clamping device according to claim 1, wherein the closing element (17) has clamping claws (20) projecting in a direction of the pincer elements (33), the clamping claws (20) having sloping clamping surfaces (44) to bear against correspondingly sloping working surfaces (41) of the pincer elements (33).

4. The clamping device according to claim 3, wherein the clamping claws (20) of the closing element (17) engage a holding element (21) axially secured inside the receiving part (1).

5. The clamping device according to claim 1, wherein the closing element (17) is forced in a direction of the pincer elements (33) by a spring arrangement (23).

6. The clamping device according to claim 1, wherein the pincer elements (33) are axially braced at their front ends against an annular shoulder (43) inside the receiving part (1) and are forced radially outward by an inner lock washer (37) inside a corresponding recess (42).

7. The clamping device according to claim 1, wherein the pincer elements (33) are forced radially inward by the clamping tension spring (39) at their rear ends, facing the closing element (17).

8. The clamping device according to claim 1, wherein the pincer elements (33) have, at their inner side, a wedge-shaped recess (34) with a sloped front draw-in surface (35).

9. The clamping device according to claim 2, wherein the loosening gear (45, 46, 47) contains a clamping cone (45), which is braced via balls (46) against a conical bearing surface (47) of a bearing bush (25) firmly arranged in the receiving part (1).

10. The clamping device according to claim 9, wherein the clamping cone (45) is braced at its rear side by pressing pins (48) against an annular shoulder (49) of the push rod (12).

11. The clamping device according to claim 10, wherein the pressing pins (48) are screwed in at the rear side of the clamping cone (45) and project through continuous holes (50) in an annular flange (51) at a rear end of the pull rod (16).

12. The clamping device according to claim 11, wherein rear free ends of the pressing pins (48) rest against a front side of the annular shoulder (49) of the push rod (12).

13. The clamping device according to claim 12, wherein forward-projecting pins (52) are secured on an outer side of the annular flange (51) and engage with corresponding blind holes (53) at a rear side of a pressing ring (54).

14. The clamping device according to claim 13, wherein the pressing ring (54) contains studs (56) for bearing against the ball (46).

15. The clamping device according to claim 1, wherein the loosening mechanism (12, 16, 45, 46, 47) comprises an electrical or pneumatic drive for moving the closing element (17) into a retracted position for releasing of the pincer elements (33).

16. The clamping device according to claim 2, wherein the closing element (17) is fastened at a front end of the pull rod (16), which is arranged coaxially about the push rod (12) and can move relative to it.

17. A clamping system omprising:
a rotationally driven work spindle (6);
a first automatically activated clamping device (57) integrated in the work spindle (6);
the device containing several pincer elements (33) which are concentrically arranged around a central axis (32) within the receiving part (1) and are impinged upon by a tension spring (39) so as to be moved into a clamping position in order to brace the tool (3) or the tool fixture, wherein the pincer elements (33) are coordinated with an axially movable closing element (17), which, in a forward position that is advanced in a direction of the pincer elements (33), pushes the pincer elements (33) for mounting purposes in their clamping position, which is swiveled inwardly by the tension spring (39), and which can move into a retracted position by a loosening mechanism (12, 16, 45, 46, 47) in order to release the pincer elements (33);

a tool-changing head (58) removably arranged in the work spindle (6) and removably secured by the first automatically activated clamping device (57); and a second automatically activated clamping device (59) integrated in the tool-changing head (58), the second automatically activated clamping device (59) constructed as the first automatically activated clamping device (57).

18. The clamping system according to claim 17, wherein the first automatically activated clamping device (57) further comprises an axially movable clamping rod (62) on which is arranged a clamping sleeve (61) for moving clamping claws (63) in order to clamp the tool-changing head (58).

19. The clamping system according to claim 18, wherein an activating rod (65) is movably guided inside the clamping rod (62) in order to move a push rod (12) inside the tool-changing head (58).

20. The clamping system according to claim 19, wherein the clamping rod (62) and the activating rod (65) can be moved by a loosening unit (60).

\* \* \* \* \*